United States Patent [19]

Verbeck

[11] Patent Number: 5,709,417
[45] Date of Patent: Jan. 20, 1998

[54] INTERFERENCE PIPE COUPLING

[76] Inventor: Ronald J. Verbeck, 2409 Bering Dr., #17, Houston, Tex. 77057

[21] Appl. No.: 792,260

[22] Filed: Jan. 31, 1997

Related U.S. Application Data

[63] Continuation of Ser. No. 659,540, Jun. 6, 1996, abandoned, which is a continuation of Ser. No. 277,988, Jul. 20, 1994, abandoned.

[51] Int. Cl.$^6$ .................................................. F16L 13/14
[52] U.S. Cl. ........................ 285/382; 285/382.2; 285/369; 285/40
[58] Field of Search ........................... 285/382, 369, 285/332.4, 382.2, 40; 29/525, 521; 403/305, 282

[56] References Cited

U.S. PATENT DOCUMENTS

| | | | |
|---|---|---|---|
| 2,147,343 | 2/1939 | Nokanson | 29/525 |
| 3,272,539 | 9/1966 | Asbury | 285/332.4 |
| 3,451,119 | 6/1969 | Coberly | 29/525 |
| 4,156,793 | 5/1979 | Carlson | 403/282 |
| 4,298,221 | 11/1981 | McGugan | 285/332.4 |
| 4,328,982 | 5/1982 | Christianson | 285/369 |
| 4,328,983 | 5/1982 | Gibson | 785/369 |
| 4,527,820 | 7/1985 | Gibson | 285/369 |
| 4,769,892 | 9/1988 | Kneller | 29/521 |
| 4,865,359 | 9/1989 | Roberts | 285/369 |

*Primary Examiner*—Eric K. Nicholson
*Attorney, Agent, or Firm*—Bush, Riddle & Jackson

[57] ABSTRACT

An interference fit pipe coupling has threaded sections inside each end portion which grip the outer walls of a plain end pipe that is forced axially thereinto. An outer, longer section of the threads are tapered Buttress-like threads that are formed on a helix, and a shorter inner section of the threads also are Buttress-like but are circumferential. A smooth cylindrical conformance bore is formed at the outer end of the threads and has an inner diameter that is less than the nominal are of the plain end pipe to reduce ovality thereof and prestress same for entry into the threads. When the plain end portion of a pipe is forced axially into the coupling, the outer threads grip the pipe end portion to provide a rigid connection, and the circumferential threads grip the pipe end portions at axially spaced points to provide metal-to-metal seals. An elastomer, plastic or other suitable material seal ring that is engaged by the opposing end faces of the pipe end portions provides a redundant or back-up fluid seal.

8 Claims, 2 Drawing Sheets

INTERFERENCE PIPE COUPLING

This application is a continuation of application Ser. No. 08/659,540 filed Jun. 6, 1996; which is a continuation of application Ser. No. 08/277,988 filed Jul. 20, 1994. Both now abandoned.

FIELD OF THE INVENTION

This invention relates generally to interference fit couplings for joining the ends of pipeline sections to one another, and particularly to a new and improved interference fit coupling of this type that provides a highly rigid, leakproof connection.

BRIEF DESCRIPTION OF THE INVENTION

Tubular pipe sections that are used, for example, in oilfield pipelines have been joined end-to-end in various ways, such as by threads, welding, bolted flanges and the like. However threaded connections tend to come loose over time, and can produce spills that are very hazardous to the environment and to personnel. Connections made by welding or flanges are labor intensive and very expensive. Another apparatus for the joining of pipe ends is disclosed in U.S. Pats. Nos. 4,328,983 and 4,527,820 where coupling sleeves are provided which have an inside diameter that is smaller than the outside diameter of the mating pipe end. Circumferential cutters in the form of thread teeth are formed on the inner walls of the coupling, as well as a smooth bore inner section. The end portion of a pipe section is forced into the bore of the coupling by a hydraulic machine and the interference fit provides a rigid coupling. In the '983 patent a twisting motion is applied to the pipe end which complicates the joining procedure, and no effective seal construction is provided to prevent fluid leakage. In the '820 patent a number of complicated and expensive seal constructions are proposed, however the seals substantially reduce the rigidity of the coupled length of the collars so that the overall integrity may be compromised. Such cellars also appear to be quite expensive to make, and thus are costly.

An object of the present invention is to provide a new and improved coupling sleeve that is constructed to achieve a rigid interference fit in a manner that alleviates the above-mentioned problems with prior devices.

Another object of the present invention is to provide a new and improved coupling sleeve of the type described having axially spaced thread forms in its bore which, when a pipe end section is forced thereunto, provide a highly rigid and leak-proof connection between pipeline ends.

Another object of the present invention is to provide a new and improved coupling sleeve of the type described which is relatively inexpensive to manufacture compared to prior devices.

Yet another object of the present invention is to provide a new and improved pipeline connection of the type described that is designed specifically with respect to pipe wall thickness, minimum yield strength, and maximum internal pressure.

SUMMARY OF THE INVENTION

These as well as other objects are attained in accordance with the present invention through the provision of a tubular coupling member adapted to have the adjacent end portions of plain end pipe lengths forced into it to provide a rigid, leak-proof, interference fit. The coupling member is in the form of a sleeve whose opposite end portions have sections of internal threads extending from adjacent their outer ends to locations inward thereof to provide first sets of helical gripping edges. Between each outer end surface of the coupling member and the outer end of each set of helical gripping edges is a smooth internal cylindrical surface providing a conformance bore. The diameter of each conformance bore is less than the nominal outer diameter of the pipe end portions to be joined. Second sets of parallel gripping edges extend respectively from the inner ends of the first set of gripping edges to locations adjacent the central portion of the sleeve. The lengths of the parallel gripping edges are substantially less than the lengths of the helical gripping edges. When the plain ends of pipe sections are forced axially into the coupling, the cylindrical conformance bores reduce pipe ovality and prestress the end sections for proper entry into the outer ends of the helical gripping edges. Upon completion of pipe end insertion, the helical gripping edges bite into the external surfaces of the pipe ends to provide a highly rigid connection, while the parallel or circumferential gripping edges bite in to provide a series of leak-proof metal-to-metal seals. A redundant or back-up resilient seal ring engaged by the end faces of the pipe sections also can be provided.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which.

DETAILED DESCRIPTION OF A PREFERRED EMBODIMENT

Figure 1:
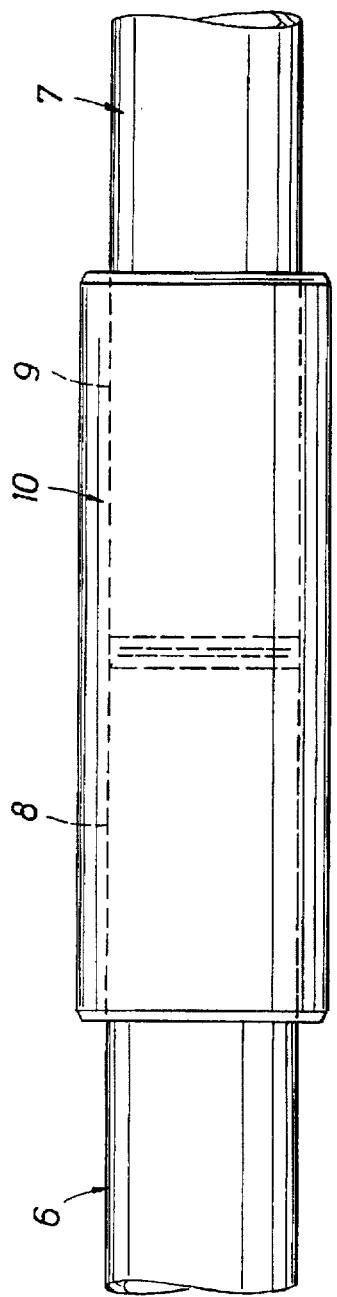
FIG. 1 shows a coupling sleeve of the present invention joining the adjacent ends of lengths of line pipe.

Referring initially to FIG. 1, a coupling sleeve 10 in accordance with this invention is shown joined to the end portions 8 and 9 of plain end members 6 and 7. Sleeve 10 and plain end pipe members 6 and 7 form a pipe joint. As will appear below, the end portions 8 and 9 are driven axially into the coupling sleeve 10 which has threads formed on its internal bore surfaces and providing a smaller inner diameter than the outer diameter of the end portions 8, 9. Thus interference fits are provided between the end portions 8, 9 and the sleeve 10 which form extremely rigid connections.

Figure 2:
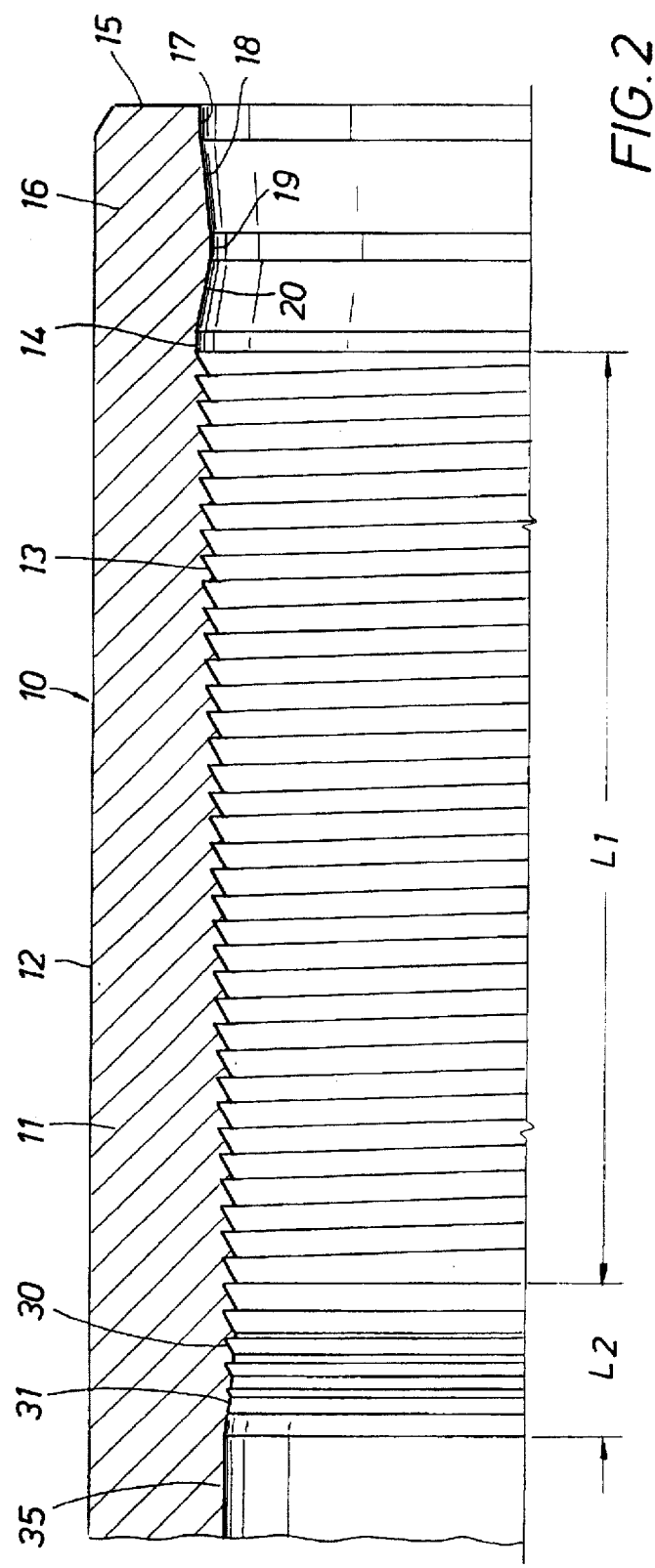
FIG. 2 is a right side-only, cross sectional view of the coupling sleeve of FIG. 1.
Figure 3:
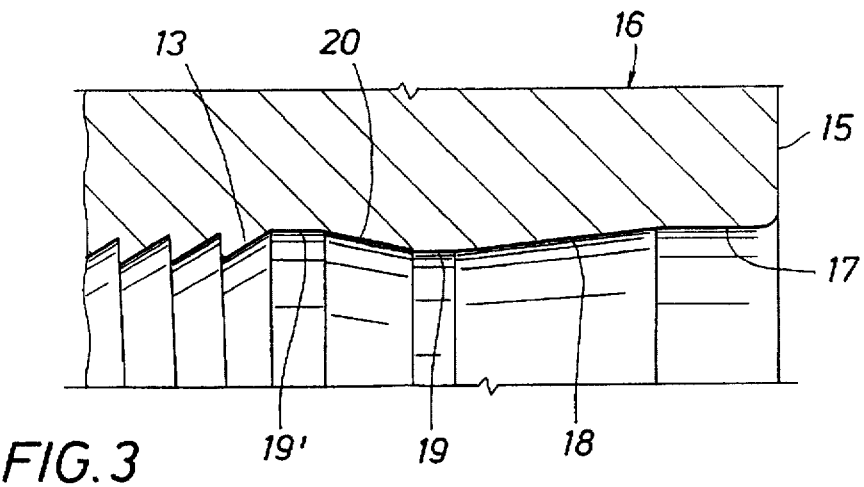
FIG. 3 is an enlarged, fragmentary view showing the outer bore portion of the coupling member.

FIG. 2 shows the structural details of the collar or coupling sleeve 10. Only a half section of one-half of the collar 10 is shown, it being recognized that the other half of the collar is the mirror-image thereof. The collar 10 includes a tubular body member 11 having a smooth cylindrical outer surface 12 and a slightly tapered inner surface 13. The larger diameter outer end 14 of the tapered surface 13 terminates short of the outer end face 15 of the body member 11, and as shown in larger detail in FIG. 3 the outer end section 16 is formed internally with a short cylindrical surface 17 that leads to an inwardly inclined surface 18. The surface 18 leads to another cylindrical surface 19, which in turn leads to an outwardly inclined surface 20. The surface 20 extends to another cylindrical surface 19' at the outer end of the threaded surface 13.

The cylindrical surface 19 provides a conformance bore which has an internal diameter that is less than the nominal o.d. of a pipe end section to be inserted into the collar 10. The bore 19 reduces pipe end ovality and prestresses or conditions the pipe end for entry into the threaded section 13.

Figure 4:
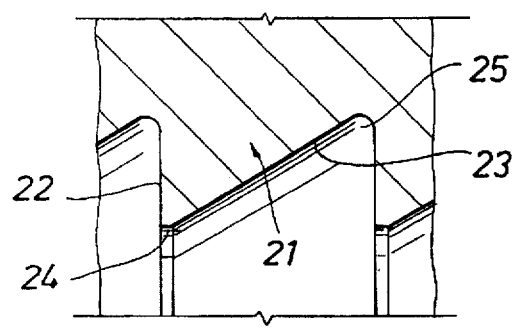
FIG. 4 is a view similar to FIG. 3 of a thread form used in the invention.
Figure 5:
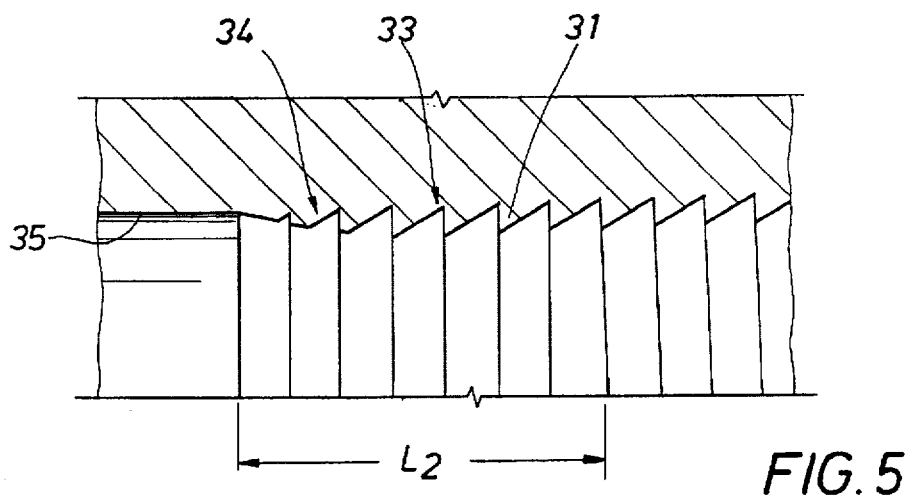
FIG. 5 is a view similar to FIG. 3 showing the middle bore portion of the sleeve member.

The threaded surface 13 extends throughout a length $L_1$ of the right half of the collar 10, and preferably has a single taper. The threads are inwardly facing Buttress-like threads 21 throughout the entire length $L_1$. As shown in FIG. 4, each thread 21 has a flat inner face 22 and an inclined outer face 23. The inner edge 24 of each thread has very little flat surface area. The valleys 25 between threads can be rounded as shown. The threads 21 can have a suitable pitch, with 14 threads per inch being preferred for most applications. At point 30 (FIG. 2) near the mid-portion of the collar 10 the threads 21 are changed from helical to parallel so as to form a series of circumferential or parallel teeth 31 as shown in larger detail in FIG. 5. The teeth 31 extend for a selected distance $L_2$, and have their maximum height in the cylindrical region 33. The tops of the last few threads 31 diminish in height in region 34, and run out at the beginning of central collar section 35 which is smooth and cylindrical.

The opposite inner bores of the collar 10 are sized for interference fits with the plain end portions 8 and 9 of the pipe members 6 and 7 as shown in FIG. 1. Using a machine of the type disclosed in U.S. Pat. No. 4,328,608 issued Mar. 11, 1982, the collar 10, which typically will have one side already forced onto the end of one pipe section, is held in a clamp while the end portion of the adjacent pipe section, which is held in hydraulically driven grippers, is forced axially thereunto. The pipe end first passes through the cylindrical conformance bore 19, which provides an interference fit as noted above, to reduce pipe end ovality and prestress the pipe end for proper entry into the outer end of the gripping edges 13. Due to the interference fit throughout, the collar 10 is progressively stressed radially outward from its outer end toward its center portion 35 during the make-up operation, and the plain pipe end section is progressively stressed inward. The material and dimensions of the collar are designed such that the hoop stresses generated therein are insufficient to cause any yielding. The amount of interference generates tremendous pressure forces which act to cause the inner edges 24 of the threads 21 to bite into and grip the pipe end portion and couple the members rigidly together. The parallel teeth 31 also bite into outer surfaces of the pipe end to provide a series of axially spaced, metal-to-metal seal rings that prevent fluid leakage from the joint.

Figure 6:
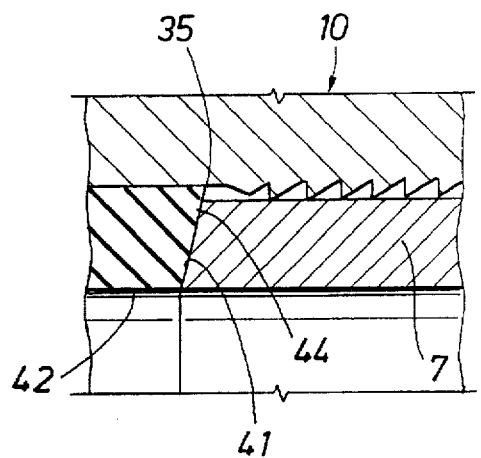
FIG. 6 is as fragmentary sectional view which depicts a back-up seal in accordance with the present invention.

If desired, a redundant or back-up seal can be provided as shown in FIG. 6 by positioning a resilient member 40 in the smooth bore section 35 of the collar 10. The member 40 can be made of a suitable elastomer or plastic material, or other suitable material. The seal ring 40 can have oppositely inclined side walls 41 and an inner surface 42 that initially has a slightly lesser diameter than the inner diameter of the pipe member 7. The plain end portions 8, 9 of the pipe members 6, 7 each have a beveled end surface 44 that engages the ring 40 when the end portions have been fully inserted into the collar 10. The inclined end surfaces 41 compress and energize the ring 40 so that it also provides a fluid-tight seal against leakage of fluids. The combination of the metal-to-metal seals provided by the teeth 31 and the resilient seal provided by the ring 40 provide a resultant sealing system that is totally immune for fluid leakage.

It now will be recognized that a new and improved interference fit pipe coupling has been disclosed which is highly rigid and leak-proof. Since certain changes or modifications may be made in the disclosed embodiment without departing from the inventive concepts involved, it is the aim of the appended claims to cover all such changes and modifications falling within the true spirit and scope of the present invention.

What is claimed is:

1. A pipe joint comprising:

a sleeve having an outer end, an axial bore, and a central portion;

a section of helical threads formed on the wall of said axial bore and extending from a first location adjacent said outer end to a second location inwardly thereof, the inner diameter of said axial bore tapering inwardly from said first location to said second location with said helical threads providing a first set of tapering gripping edges;

a section of circumferential threads formed on the wall of said axial bore extending from said second location to a third location adjacent said central portion, the inner diameter of said axial bore being uniform between said second location and said third location with said circumferential threads providing a second set of parallel gripping edges; and;

a pipe member having a plain end of an outer diameter greater than the inner diameter of said second set of parallel gripping edges and greater than the inner diameter of said first set of tapering gripping edges at said first location, the outer surface of said pipe member upon being forced within said sleeve engaging said first and second sets of gripping edges in gripping relation to provide a rigid and leak-proof intereference fit there between.

2. The pipe joint as set forth in claim 1 wherein;

said plain end has a uniform outer diameter and said sleeve has an inner cylindrical surface said first location having an inner diameter slightly less than the nominal outer diameter of said pipe member for reducing any ovality in said plain end prior to entry into said sleeve.

3. The pipe joint as set forth in claim 1 wherein an elastomeric annular seal is positioned within said sleeve adjacent said third location and inwardly of said second set of gripping edges, the end of said pipe member engaging said elastomeric seal when fully inserted within said sleeve to provide a sealing relation therewith.

4. A pipe joint comprising:

a sleeve having opposed outer ends, first and second axial bores, and a central bore between said first and second axial bores;

first and second sections of helical threads formed on the respective walls of said first and second axial bores, each of said sections extending from a first location adjacent an outer end of said sleeves to a second location inwardly thereof, the inner diameter of said axial bores tapering inwardly from said first location to said second location with said helical threads providing first sets of tapering gripping edges;

first and second sections of circumferential threads formed on the walls of said axial bores and extending respectively from said second locations to third locations adjacent said central portion, the inner diameter of said axial bore being uniform between said second location and said third location with said circumferential threads forming second sets of parallel gripping edges; and a pipe member inserted within each outer end of said sleeve, each pipe member having a plain end of a generally uniform outer diameter greater than the inner diameter of said second sets of gripping edges and greater than the inner diameter of said first sets of gripping edges at said first location, the outer surface of said pipe member upon being forced withing an end of said sleeve engaging adjacent first and second sets of gripping edges in gripping relation to provide a rigid and leak-proof interference fit therebetween.

5. The pipe joint as set forth in claim 4 wherein said sleeve has an inner cylindrical surface adjacent each outer end outwardly of the adjacent set of tapering gripping edges, said cylindrical surface having an inner diameter slightly less than the nominal outer diameter of the associated pipe member for reducing any ovality prior to entry into said sleeve.

6. The pipe joint as set forth in claim 4 wherein an elastomeric annular seal is positioned within said sleeve adjacent each of the second sets of gripping edges, the end of the associated pipe member engaging said seal when fully inserted within said sleeve to provide a sealing relation therewith.

7. The pipe joint as set forth in claim 5 wherein said sleeve has an inner outwardly inclined surface between each cylindrical surface and the adjacent set of tapering gripping edges.

8. The pipe joint of claim 4 wherein said threads have a buttress-like form with perpendicular flanks facing inwardly and inclined flanks facing outwardly.

* * * * *